(12) United States Patent
Martell et al.

(10) Patent No.: US 8,063,304 B2
(45) Date of Patent: Nov. 22, 2011

(54) CABLE PROTECTION COVER

(75) Inventors: Gregory Martell, Chanhassen, MN (US); Michael J. Wayman, Waconia, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 673 days.

(21) Appl. No.: 12/182,459

(22) Filed: Jul. 30, 2008

(65) Prior Publication Data
US 2010/0025068 A1 Feb. 4, 2010

(51) Int. Cl.
*H02G 3/14* (2006.01)
(52) U.S. Cl. .............. 174/67; 174/66; 439/144
(58) Field of Classification Search .......... 174/66, 174/67; 220/241; 439/144, 133, 147
See application file for complete search history.

(56) References Cited

U.S. PATENT DOCUMENTS

| | | | | |
|---|---|---|---|---|
| 4,915,638 | A * | 4/1990 | Domian | 439/142 |
| 7,626,121 | B1 * | 12/2009 | Cleghorn | 174/66 |
| 7,803,002 | B2 * | 9/2010 | Tan | 439/144 |

* cited by examiner

*Primary Examiner* — Dhirubhai R Patel
(74) *Attorney, Agent, or Firm* — Fogg & Powers LLC

(57) ABSTRACT

A cable protection cover for an enclosure is disclosed. The cable protection cover includes a cover shroud, a pivot bracket for attaching to the enclosure, and a pivot pin for pivotally attaching the cover shroud to the pivot bracket. The pivot bracket and the cover shroud form a cable access aperture providing a through access to an interface of the enclosure for one or more cables. The cable protection cover forms a protective barrier with the cover shroud in a closed position preventing the one or more cables from being disconnected from the interface.

20 Claims, 7 Drawing Sheets

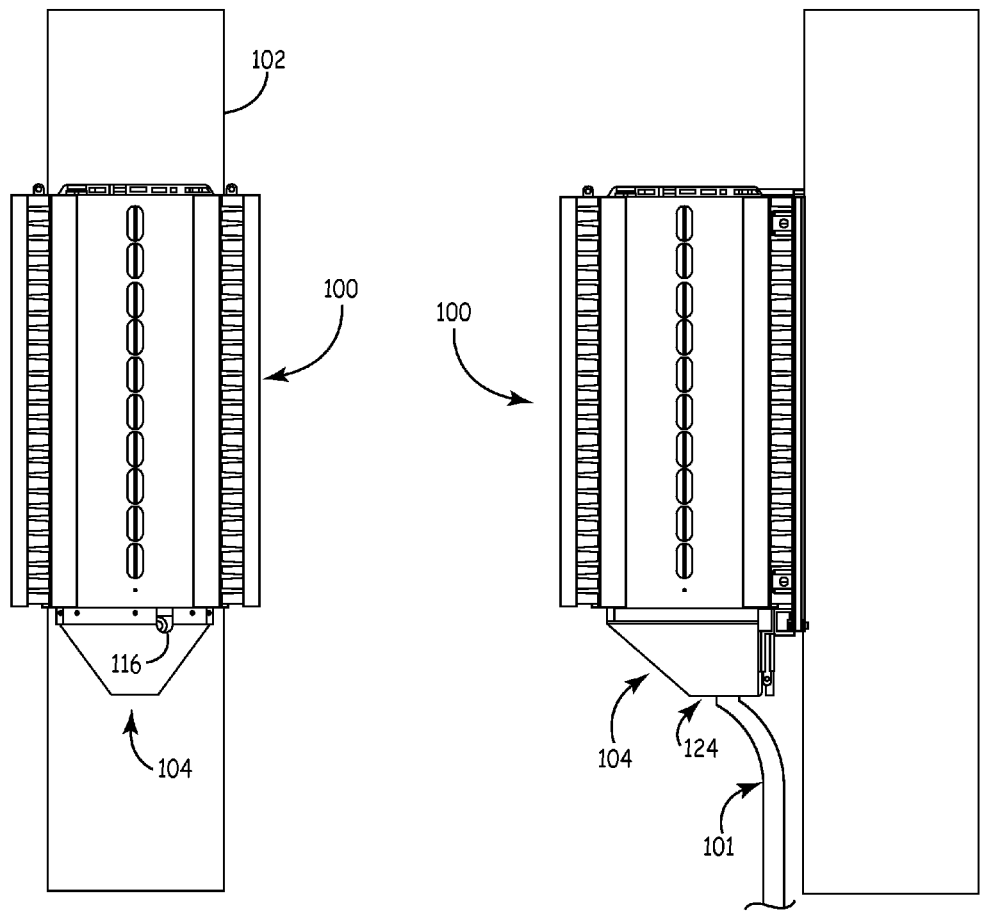
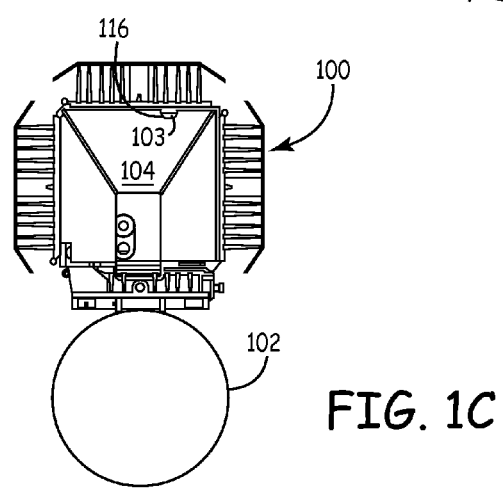

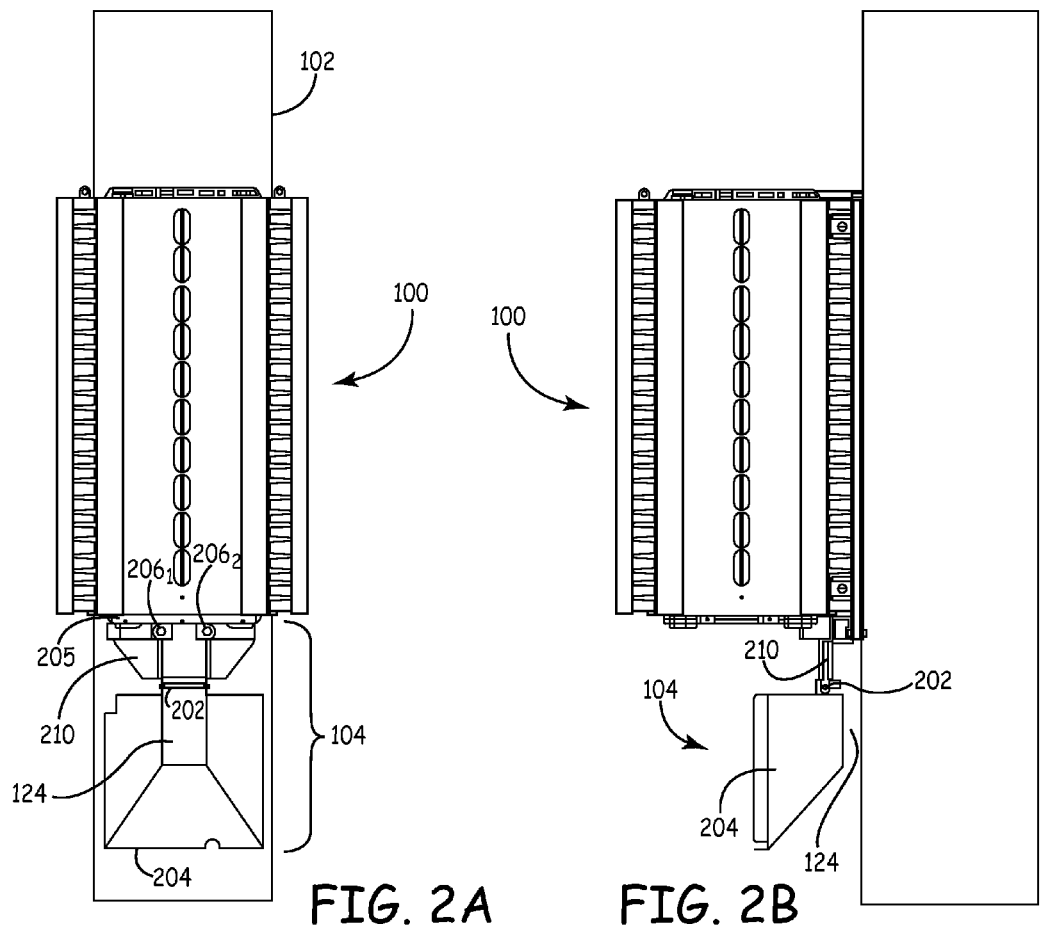
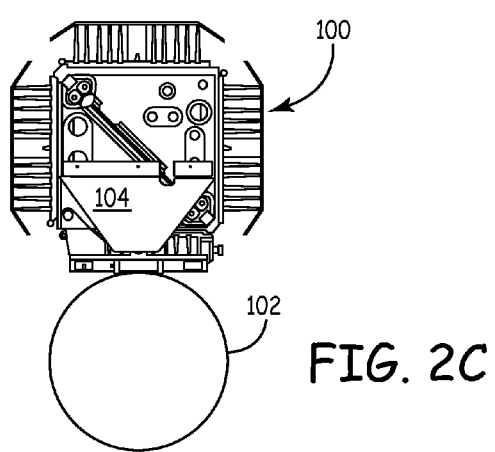

DETAIL 'A'

DETAIL 'B'

CABLE PROTECTION COVER

BACKGROUND

A typical outdoor telecommunications enclosure protects components within the enclosure from any external environmental contaminants such as (for example) rain, dust, and debris. Since external power and data connections need to be made to the enclosure, various electrical cables are readily apparent when approaching the enclosure. For example, in the case of a pole or wall mounted enclosure, it is typical for these cables to enter from the bottom of the enclosure as this orientation is the most resistant to water ingress and other similar environmental conditions.

When the enclosure is mounted in a public area, a loss of any external cable connections due to vandalism has significant economic and reliability implications for telecommunications network service providers. Conversely, an enclosure design that is overly restrictive inhibits any legitimate access to the external cable connections at the enclosure during initial installation and periodic maintenance inspections.

For the reasons stated above and for other reasons stated below which will become apparent to those skilled in the art upon reading and understanding the present specification, there is a need in the art for improvements in protecting cable connections in an outdoor telecommunications enclosure with a cable protection cover.

SUMMARY

The following specification provides for a cable protection cover for outdoor telecommunications equipment. This summary is made by way of example and not by way of limitation. It is merely provided to aid the reader in understanding some aspects of at least one embodiment described in the following specification.

Particularly, in one embodiment, a cable protection cover for an enclosure is provided. The cable protection cover comprises a cover shroud, a pivot bracket for attaching to the enclosure, and a pivot pin for pivotally attaching the cover shroud to the pivot bracket. The pivot bracket and the cover shroud form a cable access aperture providing a through access to an interface of the enclosure for one or more cables. The cable protection cover forms a protective barrier with the cover shroud in a closed position preventing the one or more cables from being disconnected from the interface.

BRIEF DESCRIPTION OF THE DRAWINGS

These and other features, aspects, and advantages are better understood with regard to the following description, appended claims, and accompanying drawings where:

FIGS. 1A and 1B are plan views of an embodiment of an enclosure having a cable protection cover in a closed position;

FIG. 1C is a plan view of the enclosure of FIGS. 1A and 1B viewed from below the enclosure with the cable protection cover in the closed position;

FIGS. 2A and 2B are plan views of an embodiment of an enclosure having a cable protection cover in an open position;

FIG. 2C is a plan view of the enclosure of FIGS. 2A and 2B viewed from below the enclosure with the cable protection cover in the open position;

The various described features are drawn to emphasize features relevant to the embodiments disclosed. Reference characters denote like elements throughout the figures and text of the specification.

DETAILED DESCRIPTION

Figure 3A:
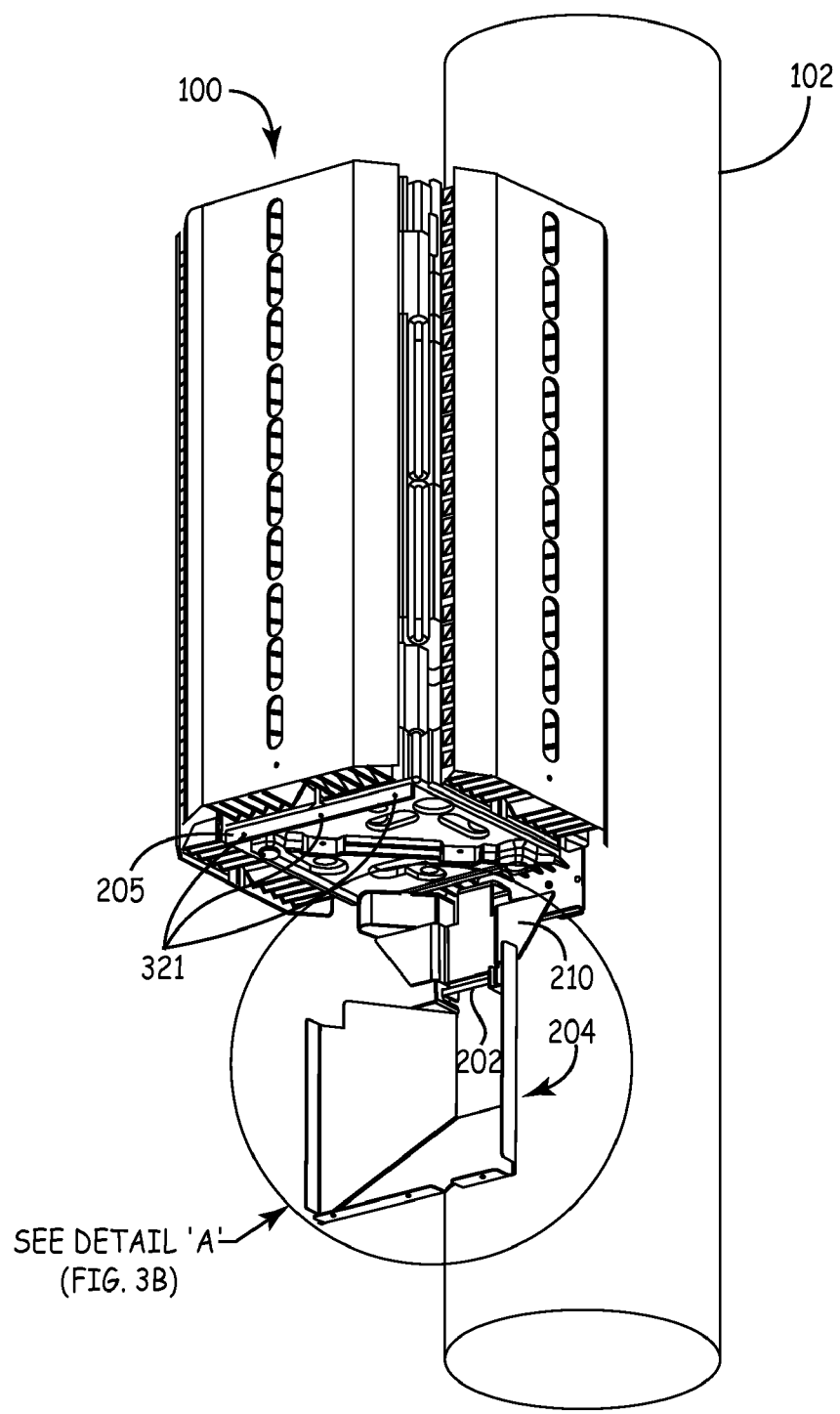
FIG. 3A is a perspective view of an embodiment of an enclosure having a cable protection cover in an open position.

Embodiments disclosed herein relate to a cable protection cover for an outdoor telecommunications enclosure. The cable protection cover provides a protective barrier to secure and conceal external cable connections for various telecommunications cables entering the enclosure. The cable protection cover protects the cables connecting at the enclosure from vandalism, theft, and the like. For at least one implementation of the enclosure, cable entry points into the enclosure are often separated as widely as possible for access. As a result, a cable bundle will be spread out directly under the enclosure to attach each cable in the cable bundle to the appropriate cable connectors, which may appear cluttered and distractive to the overall appearance of the enclosure. The cable protection cover serves to conceal these cables for a certain length until the cables are bundled in an appropriate manner below the enclosure.

In one embodiment, the cable protection cover comprises a cover shroud and a pivot bracket that form the protective barrier for unwanted access to the cable connections. As discussed in further detail below, the cover shroud pivotally rotates from the pivot bracket to provide legitimate access to the cables and the external cable connections.

FIGS. 1A and 1B are plan views of an embodiment of an enclosure 100 in a particular mounting arrangement and having a cable protection cover 104 in a closed position. FIG. 1C is a plan view of the enclosure 100 viewed from below the enclosure 100 with the cable protection cover 104 in the closed position. As shown in FIGS. 1A to 1C, the enclosure 100 mounts to a pole 102. It is understood that the enclosure 100 may be mounted to the pole 102 using one of a variety of known mounting methods for outdoor telecommunications enclosures (for example, mounting the enclosure 100 to a structure such as the pole 102 with pole bands, or the like). The cable protection cover 104 accepts a cable bundle 101 as shown in FIG. 1B through a cable access aperture 124.

The cable protection cover 104 is fabricated from materials such as, but not limited to, aluminum, steel, sheet metal, die cast metal, plastic, and the like. In one implementation, the fabrication material of the cable protection cover 104 depends on a desired level of security. For example, a relatively lighter material such as plastic is suitable for use in a mounting position and location that is less accessible than an area where the mounting position is relatively easy to access. Accordingly, in an external environment subject to vandalism and tampering, a more substantial material such as steel or die cast metal is used to fabricate the cable protection cover 104.

In the example embodiment of FIG. 1A, the cable protection cover 104 comprises a viewing port 116 to allow viewing of an operating status indicator 103 (shown in FIG. 1C) for the enclosure 100 without opening the cable protection cover 104. As discussed in further detail below with respect to FIGS. 2A and 2B, the cable protection cover 104 forms a protective barrier for the cable bundle 101 entering the enclosure 100 once the cable protection cover 104 is secured in the closed position.

FIGS. 2A and 2B are plan views of an embodiment of the enclosure 100 mounted to the pole 102 with the cable protection cover 104 in an open position. FIG. 2C is a plan view of the enclosure 100 viewed from below the enclosure 100 with the cable protection cover 104 in the open position. The enclosure 100 further comprises a locking plate 205 coupled to the base of the enclosure 100. As discussed in further detail below with respect to FIGS. 3A and 3B, the locking plate 205 engages to hold the cable protection cover 104 in the closed position shown in FIGS. 1A and 1B.

The cable protection cover 104 shown in FIGS. 2A and 2B comprises a cover shroud 204 coupled to a pivot bracket 210 via a pivot pin 202. The pivot bracket 210 attaches to a base of the enclosure 100 using mounting bolts 206-1 and 206-2 of the enclosure 100. The cover shroud 204 pivots open and suspends from the pivot pin 202. With the cable protection cover 104 in the closed position discussed above with respect to FIGS. 1A to 1C, the mounting bolts 206-1 and 206-2 are inaccessible. Thus, the cable protection cover 104 (including the pivot bracket 210) is not removable until the cover shroud 204 is suspended in the open position.

As further shown in FIGS. 2A and 2B, the cable access aperture 124 will allow the cable bundle 101 of FIG. 1B to pass through the cable protection cover 104. The cover shroud 204 and the pivot bracket 210 define the cable access aperture 124 to secure and conceal the cables received by the enclosure 100. Moreover, and as discussed in further detail below with respect to FIG. 4, the cable access aperture 124 allows the cover shroud 204 to be lifted off without disconnecting each of the external cable connections for the cable bundle 101 from the enclosure 100.

FIG. 3A is a perspective view of an embodiment of the enclosure 100 mounted to the pole 102 with the cover shroud 204 pivotally attached to the pivot pin 202. As shown in FIG. 3A, the locking plate 205 comprises slots 321 that receive one or more retaining fasteners through apertures 322 of the cover shroud 204, as discussed below with respect to FIG. 3B. In one implementation, integrated key locking cylinders and other similar aesthetically-pleasing locks (including a locking hasp) are suitable for use with the locking plate 205 to provide additional security for the cable protection cover 104, as discussed in further detail below with respect to FIG. 3B.

Figure 3B:
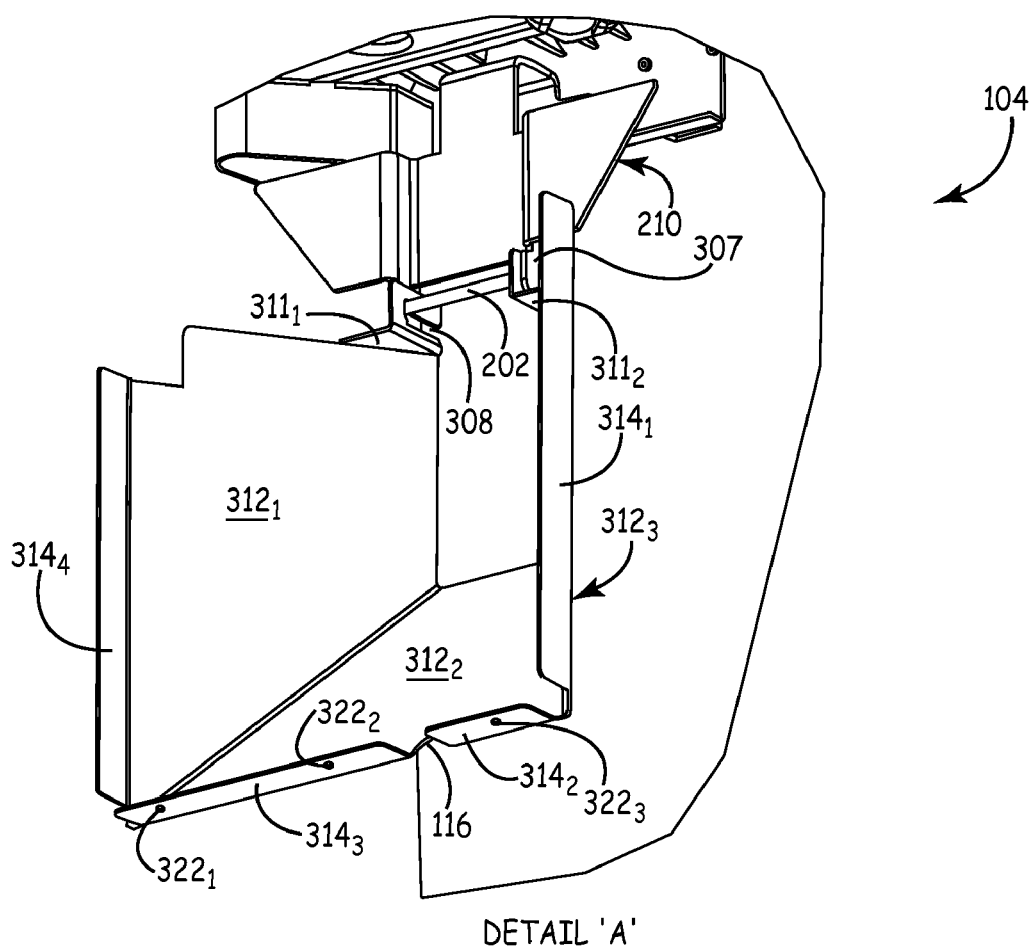
FIG. 3B is a perspective detail view in cross-section of an embodiment of the cable protection cover of FIG. 3A shown at detail 'A'.

FIG. 3B is a perspective detail view in cross-section of the cable protection cover 104 shown at detail 'A' in FIG. 3A. The detail view of FIG. 3B comprises the pivot bracket 210 having the pivot pin 202 coupled to a pivot flange plate 307 of the pivot bracket 210. In the example embodiment of FIG. 3B, the cable protection cover 104 further comprises pivot attachment flanges 311-1 and 311-2 and cover sides 312-1, 312-2, and 312-3 forming the cover shroud 204 for the cable protection cover 104. The pivot attachment flanges 311-1 and 311-2 each have a pivot pin track 308. For ease of illustration, the pivot pin track 308 for the pivot attachment flange 311-1 is shown in FIG. 3B. It is understood that each of the pivot attachment flanges 311 comprise a particular pivot pin track 308.

The cover shroud 204 pivotally rotates on the pivot pin 202 through the pivot pin track 308. The pivot pin track 308 allows for mounting and removal of the cover shroud 204, as discussed in further detail below with respect to FIGS. 5A to 5C.

In one implementation, the cover shroud 204 rotatably suspends along the pivot pin track 308 and over the pivot pin 202. For example, the cable protection cover 104 can be oriented perpendicular to the enclosure 100 for quick inspection or service of the cable bundle 101 (FIG. 1B) entering the enclosure 100. When the cable protection cover 104 is in the open position as illustrated in FIG. 3B, the cover shroud 204 is easily removable from the pivot pin 202 for more involved work on the enclosure 100. Moreover, the orientation of the pivot pin track 308 does not allow the cable protection cover 104 to be removed until it is in the position shown in FIG. 3B.

The cable protection cover 104 further comprises side flanges 314-1 to 314-4 coupled to the cover sides 312-1, 312-2, and 312-3 as shown in FIG. 3B. In one implementation, a gap between the side flanges 314-2 and 314-3 comprises the viewing port 116 discussed above with respect to FIG. 1A. In addition, the flanges 314-2 and 314-3 comprise apertures 322-1 to 322-3 to receive tamper-proof retaining fasteners in the cable protection cover 104. As discussed above with respect to FIG. 3A, in one implementation, the apertures 322-1 to 322-3 receive a padlock shank, a keylocking cylinder, or the like to engage and secure the cable protection cover 104 to the locking plate 205.

Figure 4:
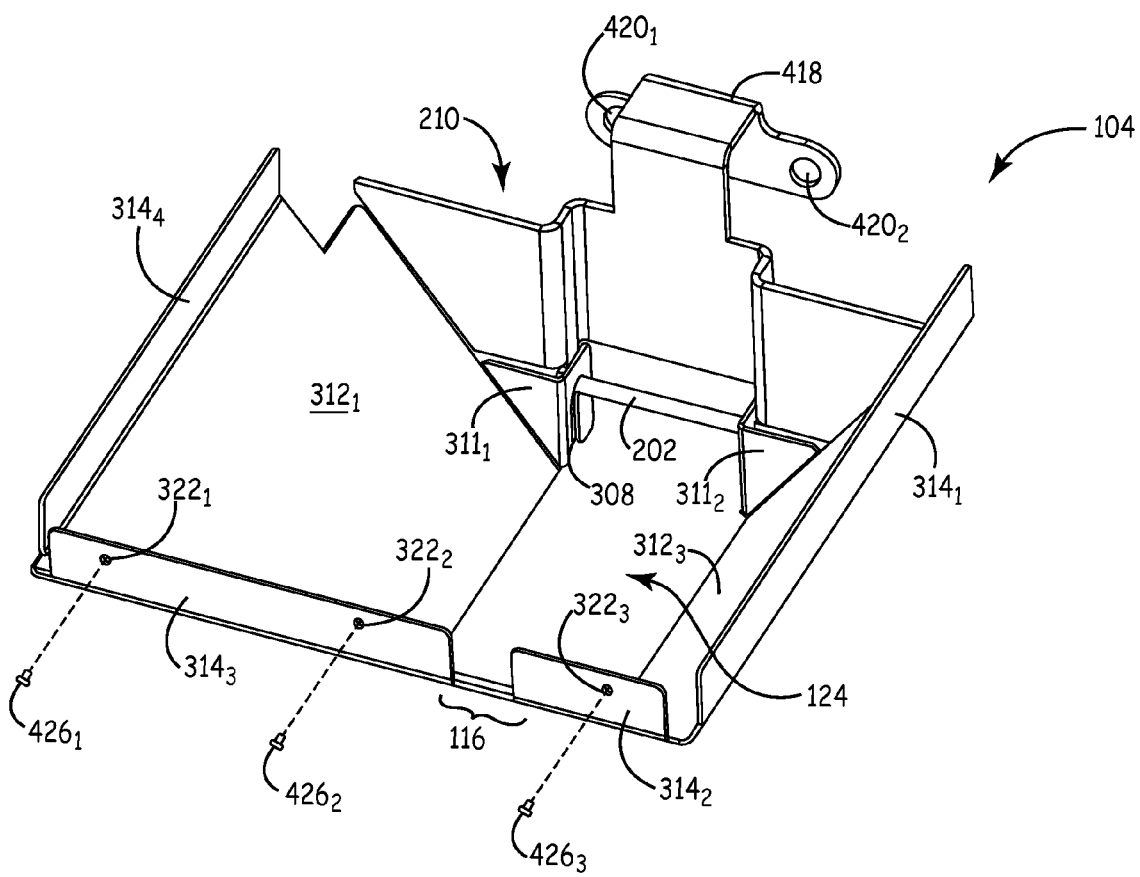
FIG. 4 is a perspective view of an embodiment of a cable protection cover for an enclosure in a closed position.

FIG. 4 is a perspective view of an embodiment of the cable protection cover 104 for the enclosure 100 in a closed position. As shown in FIG. 4, the cable access aperture 124 is bounded by the pivot bracket 210 and the cover sides 312-1, 312-2, and 312-3 of the cable protection cover 104. The pivot bracket 210 comprises a mounting bolt bracket 418 and mounting bolt apertures 420-1 and 420-2. The mounting bolt bracket 418 and the mounting bolt apertures 420-1 and 420-2 provide for a suitable installation of the cable protection cover 104 to the enclosure 100 as discussed above with respect to FIGS. 2A and 2B. In the example embodiment of FIG. 4, the mounting bolt bracket 418 is integral with the pivot bracket 410.

The cable protection cover 104 shown in FIG. 4 includes the pivot attachment flanges 311-1 and 311-2 each having the pivot pin track 308 and the side flanges 314-1 to 314-4 coupled to the cover sides 312-1 to 312-3. The cable protection cover 104 shown in FIG. 4 further includes the viewing port 116 to allow viewing of the operating status indicator 103 (FIG. 1C) for the enclosure 100 without pivotally rotating (that is, without unlocking and rotating) the cable protection cover 104. To secure the cable protection cover 104 in the closed position, the apertures 322-1 to 322-3 receive locking fasteners 426-1 to 426-3, similar to the tamper-proof retaining fasteners discussed above with respect to FIGS. 3A and 3B.

Figure 5A:
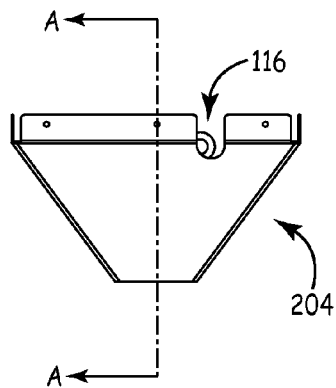
FIG. 5A is a plan view of an embodiment of a cable protection cover.
Figure 5B:
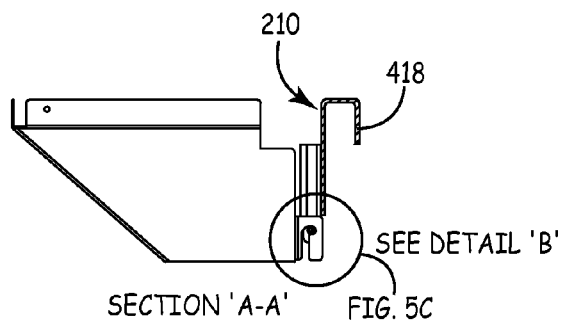
FIG. 5B is a plan detail view in cross-section of an embodiment of the cable protection cover of FIG. 5A shown at section 'A-A'.
Figure 5C:
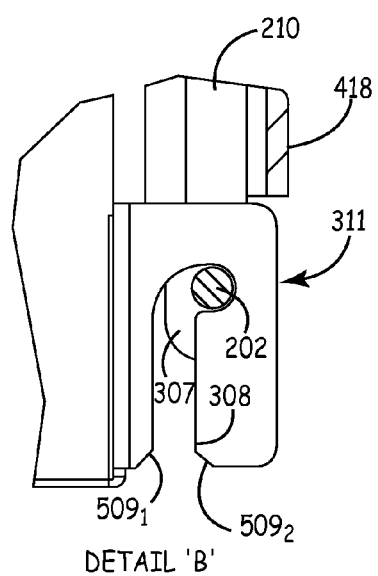
FIG. 5C is a plan detail view of an embodiment of the cable protection cover of FIGS. 5A and 5B shown at detail 'B'.

FIG. 5A is a plan view of the cover shroud 204 for the cable protection cover 104. FIG. 5B is a plan detail view in cross-section of the cable protection cover 104 shown at section 'A-A'. FIG. 5C is a plan detail view of the cable protection cover 104 shown at detail 'B'. The viewing port 116 is shown in the particular view of FIG. 5A. The pivot bracket 210 and the mounting bolt bracket 418 are shown in the particular view of FIG. 5B. FIG. 5C also shows the pivot bracket 210 and the mounting bolt bracket 418, along with the pivot pin 202 coupled to the pivot flange plate 307. As discussed above, the cover shroud 204 pivotally rotates on the pivot pin 202 via the pivot pin track 308 of the pivot attachment flange 311. The pivot pin track 308 allows for installation and removal of the cover shroud 204. To install the cover shroud 204, lead in chamfers 509-1 and 509-2 guide the pivot attachment flange 311 at the pivot pin 202 and along the pivot pin track 308 to the position as shown in FIG. 5C. In addition, the pivot pin track 308 allows the pivot attachment flange 311 to rotatably suspend on the pivot pin 202 and place the cover shroud 204 in the open position discussed above with respect to FIGS. 2A to 2C.

Figure 6:
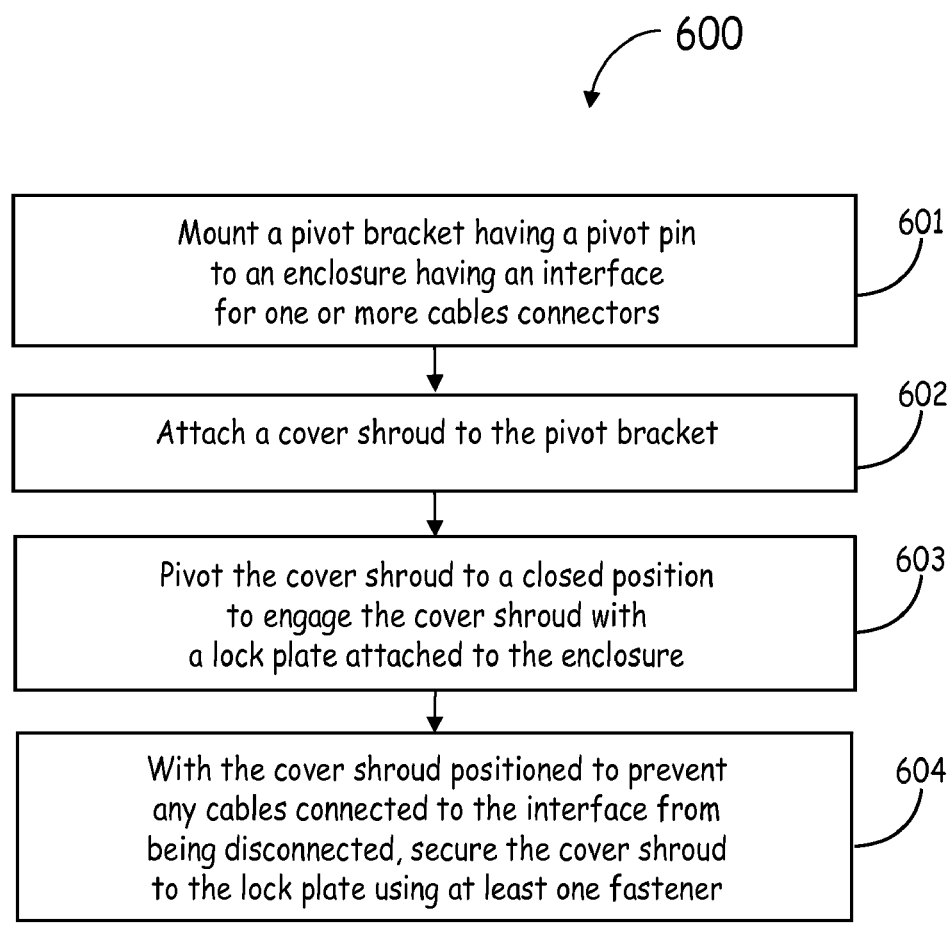
FIG. 6 is a flow diagram of an embodiment of a method to prevent tampering with external cables connected to an enclosure.

FIG. 6 is a flow diagram of a method 600 to prevent tampering with external cables connected to an enclosure. In one embodiment, the method 600 addresses providing a system of cable protection to secure and conceal connections for a plurality of cables entering the enclosure. The system addressed by the method of FIG. 6 protects these cable connections from vandalism, theft, and the like.

The method 600 provides for mounting a pivot bracket having a pivot pin to the enclosure having an interface for one or more cable connectors (block 601). The method 600 further involves attaching a cover shroud to the pivot bracket (block 602). In particular, the cover shroud includes one or more tracks that engage the pivot pin to create an axis of rotation for pivoting the cover shroud with respect to the pivot bracket. The cover shroud and the pivot bracket form an aperture around the interface when the cover shroud is attached to the pivot pin. The aperture formed by the cover shroud and the pivot bracket provides a through access to the interface for each of the cables.

With the cover shroud attached to the pivot pin on the pivot bracket, the cover shroud pivots to a closed position to engage the cover shroud with a lock plate attached to the enclosure (block 603). With the cover shroud positioned to prevent any of the cables connected to the interface from being disconnected, the cover shroud secures to the lock plate using at least one fastener (block 604). Moreover, with the cover shroud in the closed position and secured to the lock plate, the cover shroud conceals the cables and the mounting bolts of the pivot bracket to prevent any unauthorized access to the enclosure interface and the cable connectors. Once the cover shroud is installed, the cables for the enclosure can be connected and disconnected by disengaging the shroud from the lock plate and pivoting the shroud down to an open position to gain access to the enclosure interface.

With the cover shroud in the open position, the cover shroud suspends from the pivot pin and any of the cables connected to the interface are accommodated through the aperture still formed by the cover shroud and the pivot bracket. When in the open position, the cover shroud can be removed from the pivot bracket without disconnecting the cables simply by sliding the tracks of the cover shroud off of the pivot pin.

This description has been presented for purposes of illustration, and is not intended to be exhaustive or limited to the embodiments disclosed. The embodiments disclosed are intended to cover any modifications, adaptations, or variations that fall within the scope of the following claims.

What is claimed is:

1. A cable protection cover for an enclosure, the cover comprising:
    a cover shroud;
    a pivot bracket for attaching to an enclosure; and
    a pivot pin for pivotally attaching the cover shroud to the pivot bracket;
    wherein the pivot bracket and the cover shroud form a cable access aperture providing a through access to an interface of the enclosure for one or more cables; and
    wherein the cable protection cover forms a protective barrier with the cover shroud in a closed position preventing the one or more cables from being disconnected from the interface.

2. The cover of claim 1, wherein the cover shroud comprises:
    at least two sides; and
    at least two pivot attachment flanges individually coupled to the at least two sides, each of the at least two pivot attachment flanges having a pivot pin track for pivotally rotating the cover shroud from the pivot pin.

3. The cover of claim 2, wherein each of the at least two pivot attachment flanges comprise lead-in chamfers to guide each of the pivot attachment flanges along the pivot pin track when attaching the cable protection cover to the pivot bracket.

4. The cover of claim 2, wherein the at least two pivot attachment flanges allow the cover shroud to suspend perpendicular to the enclosure in an open position along the pivot pin track for access to the plurality of cables entering the enclosure.

5. The cover of claim 4, wherein the at least two pivot attachment flanges allow the cover shroud to be removed from the pivot bracket with the cover shroud suspended along the pivot pin track.

6. The cover of claim 1, wherein the cover shroud comprises one or more apertures suitable for retaining and securing the cover shroud to the enclosure with at least one tamper-proof retaining fastener.

7. The cover of claim 6, wherein the at least one tamper-proof retaining fastener is one of a locking fastener, a padlock shank, or a key-locking cylinder.

8. The cover of claim 1, wherein the pivot bracket comprises a mounting bolt bracket to secure the pivot bracket to a base plate of the enclosure, the mounting bolt bracket and the pivot bracket inaccessible with the cable protection cover in the closed position.

9. The cover of claim 8, wherein the mounting bolt bracket is integral with the pivot bracket.

10. The cover of claim 1, wherein the pivot pin is coupled between a set of pivot flange plates of the pivot bracket.

11. The cover of claim 1, further comprising:
    a viewing port for viewing an operating status indicator for the enclosure.

12. A system of cable protection for an enclosure, the system comprising:
    an enclosure to receive cables;
    a pivot bracket mounted to the enclosure; and
    a cover shroud pivotally attached to the pivot bracket, the cover shroud including pivot attachment flanges coupled to opposing sides of the cover shroud, each of the pivot attachment flanges having a pivot pin track for rotating the cover shroud from the pivot bracket to a closed position on the enclosure;
    wherein the cover shroud forms a cable protection cover with the pivot bracket to secure and conceal the cables received by the enclosure through a cable access aperture bounded by the cover shroud and the pivot bracket.

13. The system of claim 12, wherein the pivot bracket comprises a pivot pin coupled between a set of pivot flange plates of the pivot bracket.

14. The system of claim 12, wherein the cover shroud rotates away from the enclosure along the pivot pin track of the pivot attachment flanges to provide access to the cables at the enclosure.

15. The system of claim 12, wherein the pivot attachment flanges allow the cover shroud to be removed from the pivot bracket along the pivot pin track.

16. The system of claim 12, wherein the cover shroud has one or more apertures suitable for retaining the cover shroud to the enclosure with one of a locking fastener, a padlock shank, or a key-locking cylinder.

17. The system of claim 12, wherein the cover shroud and the pivot bracket are fabricated from one of aluminum, steel, plastic, sheet metal, or die cast metal.

18. A method to prevent tampering with external cables connected to an enclosure, the method comprising:
mounting a pivot bracket having a pivot pin to an enclosure having an interface for one or more cable connectors;
attaching a cover shroud to the pivot bracket, wherein the cover shroud includes one or more tracks that engage the pivot pin to create an axis of rotation for pivoting the cover shroud with respect to the pivot bracket,
wherein when the cover shroud is attached to the pivot pin, the cover shroud and the pivot bracket form an aperture around the interface, the aperture providing a through access to the interface for one or more cables;
pivoting the cover shroud to a closed position to engage the cover shroud with a lock plate attached to the enclosure; and
securing the cover shroud to the lock plate using at least one fastener;
wherein when the cover shroud is secured to the lock plate, the cover shroud is positioned to prevent any of the cables connected to the interface from being disconnected.

19. The method of claim 18, wherein when the one or more cables are connected to the one or more cable connectors, the method further comprises:
disengaging the cover shroud from the lock plate; and
pivoting the cover shroud to an open position to access the one or more cable connectors.

20. The method of claim 18, wherein pivoting the cover shroud to a closed position further comprises:
concealing the cables and the interface connections; and
concealing mounting bolts of the pivot bracket within the cover shroud.

* * * * *